United States Patent
Shah et al.

(10) Patent No.: US 12,507,705 B2
(45) Date of Patent: Dec. 30, 2025

(54) SYSTEMS AND METHODS FOR MAKING PLANT-BASED CHEESE: "PLANTLY"

(71) Applicant: SPX Flow Technology Danmark A/S, Silkeborg (DK)

(72) Inventors: Pranav Shah, Soeborg (DK); Thomas Leroy, Evreux (FR); Sebastian Ferre, Evreux (FR)

(73) Assignee: SPX Flow Technology Danmark A/S, Silkeborg (DK)

( * ) Notice: Subject to any disclaimer, the term of this patent is extended or adjusted under 35 U.S.C. 154(b) by 246 days.

(21) Appl. No.: 17/155,978

(22) Filed: Jan. 22, 2021

(65) Prior Publication Data
US 2022/0232845 A1  Jul. 28, 2022

(51) Int. Cl.
*A23C 20/02* (2025.01)
*A23L 11/40* (2021.01)

(52) U.S. Cl.
CPC ............ *A23C 20/025* (2013.01); *A23L 11/40* (2021.01); *A23C 2250/052* (2013.01)

(58) Field of Classification Search
CPC ............ A23C 20/025; A23C 2250/052; A23C 2250/054; A23C 20/00; A23C 20/02; A23L 11/40; C12Y 203/02013
See application file for complete search history.

(56) References Cited

U.S. PATENT DOCUMENTS

| | | | | |
|---|---|---|---|---|
| 3,904,779 A | * | 9/1975 | Hinds, Jr. | A01J 25/118 426/582 |
| 9,011,949 B2 | * | 4/2015 | Brown | A23C 20/02 426/63 |
| 2016/0296060 A1 | | 10/2016 | Palsson | |
| 2019/0261641 A1 | * | 8/2019 | Arechiga | A23C 19/054 |

FOREIGN PATENT DOCUMENTS

| | | | |
|---|---|---|---|
| DE | 202007017700 U1 * | 6/2009 | A23C 20/005 |
| EP | 2943077 A1 | 11/2015 | |
| EP | 3944766 A2 | 2/2022 | |
| WO | 2014/110540 A1 | 7/2014 | |
| WO | 2015/185539 A1 | 12/2015 | |

OTHER PUBLICATIONS

Earnstrom CA, and Kale CG, "Continuous Manufacture of Cottage and Other Uncured Cheese Varieties," Journal of Dairy Science, vol. 58, No. 7, p. 1008-1014, 1974 (Year: 1974).*

(Continued)

*Primary Examiner* — Jenna A Watts
(74) *Attorney, Agent, or Firm* — IceMiller LLP (57) ABSTRACT

Systems and methods for preparing plant-based cheese comprise preparing a plant-based cheese mixture, transferring the plant-based to a heat exchanger, heat treating* and cooling the plant-based mixture, dynamically mixing additional ingredients, possible homogenizing the plant-based cheese mixture, and packaging the homogenized plant-based cheese product. In embodiments, heat treatment can occur between 85-95° C. and cooling occurs at 65-70° C. Homogenization can occur before or after heat treatment. A related cheese making apparatus is also disclosed.

19 Claims, 2 Drawing Sheets

(56) References Cited

OTHER PUBLICATIONS

"Cheese," Reiser, Nov. 11, 2020 [online], [retrieved Jan. 23, 2023]. Retrieved from the Internet <https://web.archive.org/web/20201111034616/http://reiser.com/cheese/cheese.php> (Year: 2020).*
Volken de Souza, et. al., "Kinetics of thermal inactivation of transglutaminase from a newly isolated Bacillus circulans BL32," J Chem Technol Biotechnol 2009; 84: 1567-1575 (Year: 2009).*
"Wiki: Starter Cultures Function," Cheesforum.org, Dec. 5, 2010 [online], [Retrieved Jan. 30, 2023], Retrieved from the Internet <cheeseforum.org/articles/wiki-cheese-starter-cultures-function/> (Year: 2010).*
Bi W, et. al., "Imitation Cheese Manufacture Using Rapid Visco-Analyzer and Its Optimization," International Journal of Food Properties, 19:1053-1064, 2016 (Year: 2016).*
Peamprasart T and Chiewchan N, "Effect of fat content and preheat treatment on the apparent viscosity of coconut milk after homogenization,"Journal of Food Engineering 77 (2006) 653-658 (Year: 2006).*
"Homogenizers," TetraPak, Aug. 6, 2020 [online], [Retrieved Jan. 25, 2023]. Retrieved from the Internet <https://dairyprocessinghandbook.tetrapak.com/chapter/homogenizers> (Year: 2020).*
"Why Soak Nuts?" Nature's Eats, 2020 [online], [retrieved Jan. 25, 2023]. Retrieved from the Internet <https://natureseats.com/why-soak-nuts> (Year: 2020).*
"Dairy Heat Exchangers," from Southwest Thermal Technology Inc., Feb. 6, 2010, retrieved Sep. 25, 2023 from the internet < https://www.sanitaryexchangers.com/DairyHeatExchangers.html> (Year: 2010).*
Extended European Search Report for EP 22153024.9, dated Jun. 24, 2022.

* cited by examiner

SYSTEMS AND METHODS FOR MAKING PLANT-BASED CHEESE: "PLANTLY"

TECHNICAL FIELD

The present disclosure relates to systems and methods for making plant-based cheeses like spreadable (cream-cheese type), ripened, (soft/semi-hard) and pizza topping.

BACKGROUND

Traditional methods for making cheese utilize a fermentation process involving dairy and animal-based products, such as raw milk, rennet, casein, and/or whey protein. Cheese-making processes can also be milk-powder based, e.g., without whey separation, such as the methods found in WO 2006/030128 A1 and WO 2008/151820 A1. While recipes for traditional cheeses may vary widely, e.g., depending on the type of cheese being produced, availability of ingredients, desired texture and nutritional composition of the end product, etc., the production process is inevitably directed to, and dependent upon, dairy-based products and their particular chemical makeup. As such, traditional cheese-making processes require specific, often labor, time, and energy-intensive operations depending on the type of dairy products being used.

Plant-based cheeses aim to offer an alternative to these traditional, dairy-based cheese by eliminating dairy and other animal ingredients. Plant-based cheese may be made from various plant based raw materials, deriving plant-based protein sources, plant-based fat sources and plant-based carbohydrates, and can often be similar in taste, texture, and culinary applications of traditional cheese. The dairy-free nature of plant-based cheese further allows individuals with dairy allergies, sensitivities, and dietary concerns to enjoy cheese products and cheese-based foods. The nutritional make-up of plant-based cheeses are often significantly lower in cholesterol and saturated fat compared to traditional dairy cheese as well as more sustainable. Thus plant-based cheeses have become a desirable food product.

However, due to the fundamental compositional differences between dairy-based and plant-based cheeses, traditional cheese-making methods have not been applicable to plant-based cheeses. Traditional methods are not successful in creating a plant-based cheese product with similar characteristics, e.g., texture, taste, etc., largely due to the traditional processes being tailored to ingredients, like rennet, milk, milk related bacterial cultures, and dairy products, not utilized in plant-based cheese. For example, temperatures at which dairy-based cheeses are produced have been found to be significantly different depending which plant-based source is used for application to plant-based processes, as will be further discussed herein.

In addition, many traditional cheese-making processes are open processes that often require manual labor to add, transfer, mix, or fill ingredients and mixtures throughout production, thus resulting in an inefficient, time-consuming process. Even in many mechanical and automated processes, the product is exposed to air and/or other potential contaminants at points along the production line. As such, traditional open production processes provide opportunities for contamination and inefficiencies, such as mechanical errors, mishandling, and user error. Thus, there is a need for an efficient, hygienic, and effective plant-based cheese-making process, which can also reduce or eliminate many production inefficiencies found in traditional dairy-based cheese-making processes.

SUMMARY

Disclosed herein are systems and methods for making plant-based cheese products, such as dairy-free cheese. Embodiments of the present invention provide for a continuous and closed cheese-making process that reduce or eliminate the need for manual or labor-intensive operations for various steps of the cheese production without any creation of waste or by-product or draining of waste or by-product, giving 100% yield. Present embodiments allow for a streamlined, efficient process that reduces the overall time to produce the product, compared with traditional cheese-making processes, and can reduce the amount of physical space, e.g., factory floor space required to implement systems and methods. Compared to traditional processes, the level of automation as described in this process is relatively higher and without manual interventions.

Embodiments of the present invention are designed with an ability to be continuous and under closed condition from start until the product is packed. As such, there are significant hygienic advantages over traditional methods, due to the lack of contact and exposure of the product with the atmosphere or humans. Various embodiments utilize an inclined tank with a bottom-mounted high shear mixer, e.g., an SPXFLOW Processor, under vacuum at 200 to 500 mbar, thus providing continuous gentle axial agitation and high shear mixture for emulsification. A positive booster pump can assist in achieving homogeneous mix during mixing and internal recirculation.

In various embodiments, plant-based ingredients and enzyme(s) for protein preparation are mixed, then given a heat temperature treatment, including holding and cooling, in scraped surface heat exchanger, e.g., at low rpm (700-800 rpm). Addition of ingredients, mixing, homogenization (at 200-250 bar), heat treatment, (or homogenization after heat treatment at 200-250 bar) acidification, dynamic mixing, and hot filling. In case of making spreadable cheese, second homogenization before hot filling can be foreseen at 50-100 bar.

Types of plant-based cheeses include but are not limited to plant-based spreadable (cream cheese) type, plant-based semi-hard cheese, plant-based pizza topping cheese.

Other features and advantages of the invention will be apparent from the detailed description that follows.

BRIEF DESCRIPTION OF THE DRAWINGS

The foregoing summary, as well as the following detailed description of the invention, will be better understood when read in conjunction with the appended figures. For the purpose of illustrating the invention, the figures demonstrate embodiments of the present invention. It should be understood, however, that the invention is not limited to the precise arrangements, examples, and instrumentalities shown.

DETAILED DESCRIPTION

The instant disclosure provides systems for making plant-based cheese and methods for making plant-based cheese. In certain embodiments, the system and methods are specifically designed to be continuous and under closed condition from start until the product (the plant based cheese is packed).

According to the disclosure there is provided a method of making plant-based cheese comprising: preparing a plant-based cheese mixture comprising plant-based ingredients and enzymatic action; homogenization, pumping the plant-based cheese mixture into a heat exchanger; heat treating the plant-based cheese mixture for a holding time; cooling the plant-based cheese mixture; dynamically mixing (in case of addition of acids or starters), additional ingredients; additional optional homogenizing the plant-based cheese mixture; and packaging the plant-based cheese mixture. The process is carried out under closed conditions, e.g. high hygiene conditions.

In accordance with the present disclosure, the plant-based cheese mixture is dairy-free. Preparing the plant-based cheese mixture comprises mixing and emulsifying the plant-based ingredients. The preparation may occur in a vacuum mixture.

In accordance with the present disclosure, mixing occurs at an agitation rate of 700-800 rpm, (or more depending on the type of Plant-based raw material. As the product viscosity increases the rpm of the agitator should be increased up to 3000 rpm). In addition, preparing the mixture comprises of mixing and emulsifying at a temperature less than 50° C. In embodiments, preparing and mixing comprises emulsifying the mixture for ten minutes, hydrating the mixture for around thirty minutes, and allowing enzyme action to occur for sixty minutes. In embodiments, the enzymatic intervention is incorporated. In embodiments, transglutaminase can be an enzyme utilized in the enzymatic intervention. The enzyme is used before the heat treatment and gets inhibited subsequently during the heat treatment. So final product will be free of the added enzyme, giving it possibility of classified as clean-label if no other additive (like stabilizer or texturizer) is used in the recipe. Addition of ingredients, mixing, homogenization (at 200-250 bar), heat treatment, (or homogenization after heat treatment at 200-250 bar)

In accordance with the present disclosure, heat treating occurs around 85-95° C. Heat treating can occur for a holding time, which may be 10-20 seconds. Heat treating can occur at a scrapper rate of 700-800 rpm for SSHE, and at a rate of approximately 750 rpm. cooling occurs around 38-45° C. in case of starter, while in case of organic acid cooling occurs at 65-75° C.

In accordance with the present disclosure, additional ingredients can be added to the plant-based cheese mixture. Additional ingredients can comprise at least one of: an organic acid, a plant-based bacterial culture, and a salt.

In accordance with the present disclosure, after dynamically mixing the additional ingredients, the plant-based cheese mixture can be transferred to a buffer tank. In embodiments, the buffer tank is a thermostatic buffer tank. In embodiments, the buffer tank is maintained at a temperature of 60-70° C. if organic acid is added and at 38-45° C. in case of starter cultures addition. Homogenization step is chosen depending on the type of raw material chosen and also type of cheese being made. In case of making spreadable cheese, second homogenization before hot filling can be foreseen at 50-100 bar.

In accordance with the present disclosure, additional ingredients are dynamically mixed together. In embodiments, dynamically mixing comprises first adding at least one of the starter or the acid, then adding the salt.

In accordance with the present disclosure, the plant-based cheese mixture can be filled into packaging. In embodiments, the mixture is hot-filled. Filling can occur at temperatures less than 50° C., in the case of bacteria culture acidification. While in case of organic acid acidification, the hot filling takes place at 60-70° C.

In accordance with embodiments, after hot filling, the product can rest in at least one of a hot room for acidification in case of bacterial acidification until target pH of 5.0+/−0.2 is achieved, and then moved to a cold storage room. While in case of organic acid acidification, the required pH is instantly achieved. So product can be moved to cold store for cooling it down.

In accordance with embodiments, a total production time is less than two hours, and can be less than ninety minutes.

In accordance with the present disclosure, embodiments comprise systems for making plant-based cheese. Embodiments can comprise: a vacuum mixer to combine a plant-based cheese mixture comprising plant-based ingredients and at least one enzyme; a displacement pump, e.g., a positive displacement pump, for transferring the plant-based cheese mixture; a heat exchanger to heat treat the plant-based cheese mixture for a holding time, then cool the plant-based cheese mixture; a buffer tank, such as a thermostatic buffer tank; a dynamic mixer to have homogeneous mixture; and a homogenizer to have spreadable texture in case of spreadable cheese.

In accordance with the present disclosure, the mixer can be a vacuum mixer. The mixer can further comprise an inclined tank namely SPXFLOW Flexmix Processor. The displacement pump can comprise stainless steel. In embodiments, the heat exchanger is a scraped-surface heat exchanger. Its important to note here that all equipment surfaces in contact with product can be made of stainless steel In accordance with the present disclosure, the thermostatic buffer tank comprises a conical bottom and is maintained at a temperature between 60-70° C. in case of organic acid acidification and 38-45° C. in case of bacteria culture acidification.

In accordance with the present disclosure, systems, methods, and apparatuses can comprise a packager configured to package the plant-based cheese mixture.

Other characteristics and advantages will become clear from the following detailed description of exemplary embodiments in accordance with the disclosure.

Embodiments of the present invention may include cheese-making systems, methods, and apparatuses. A cheese-making system may comprise a mixer, a SPXFLOW Flexmix processor, heating means, cooling means, and at least one pump, such as a positive displacement pump. These components may be arranged in any of a variety of configurations, in one or more devices, systems, apparatuses, and housings, and may be configured for methods of making plant-based cheeses.

Figure 1:
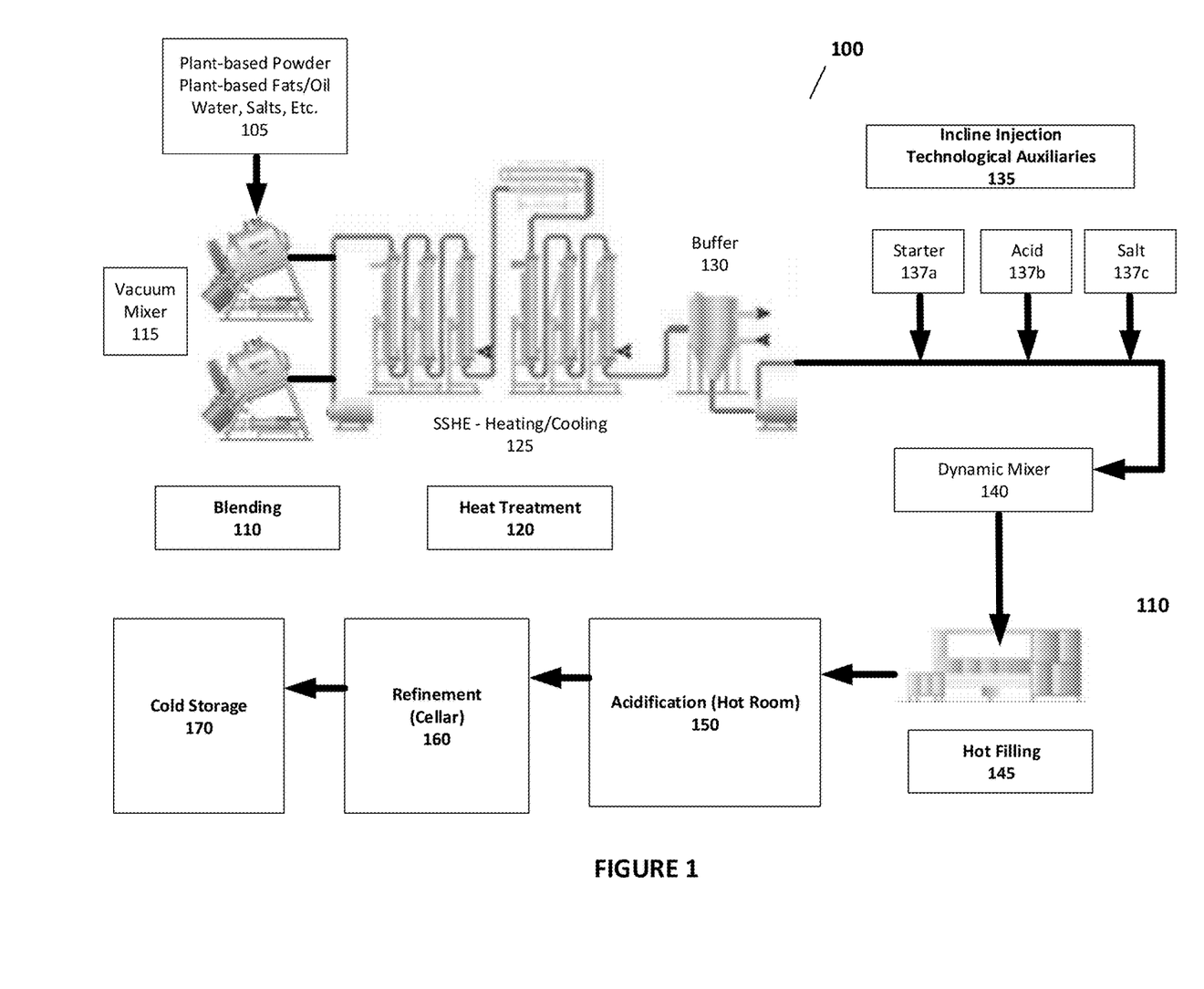
FIG. 1 illustrates an apparatus for making plant-based cheese in accordance with embodiments discussed herein.

FIG. 1 illustrates a plant-based cheese-making system 100 in accordance with embodiments. Embodiments comprise components for blending 110, heating and cooling 125, buffering 130, mixing 140, filling 145, acidification 150, refinement 160, and storage 170. Preferably the system is configured such that the plant-based cheese can be made continuously. The system is also preferably configured so that the system can be operated under closed loop conditions from start until packaging of the product (i.e. storage).

In embodiments, plant-based ingredients, such as mixes, starters, powders, and/or other ingredients including but not limited to powder, fats, oils, water, salts, nuts (almond, cashew, etc.), legumes, oats, soy, other plant-based sources etc., can be combined in one or more devices to initiate blending 110. Such devices can be a vacuum mixer 115 or other mixer or processor, which may be a solid-liquid mixer or processor. Embodiments can further include an in-line mixer, connected after a processor. Solid-liquid mixing and processing devices can include any mixer capable of mixing solids with liquids at the desired temperature and shear rate. One example is the FLEX-MIX PROCESSOR mixer of SPX Flow Technology, with or without a high shear rate impeller installed. The chosen blending device may have a variety of settings and mixing/processing configurations. In examples, the one or more devices should have sufficient power in order to provide a shear rate of at least 5,000/sec, or of at least 10,000/sec. In embodiments, there may be vacuum means for applying low pressure or vacuum at the head space of the vacuum mixer. The plant-based powders and other plant-based ingredients are sucked from the hopper, while fat from the connected bulk container. The adapted quantities should have been previously weighed.

In an embodiment, the mixer 115 comprises is an inclined tank with a bottom mounted high shear mixer. This mixer can function, in part, as an axial agitator and/or partly as an in-line mixer. It can create an axial flow, which is re-circulated in the tank by means of the surrounding mixer chamber and/or a positive booster pump, which is used to bypass and re-circulate the flow over the tank. The bypass flow is returned into the tank and the inclined tank ensures that no liquid rotation (forced vortex) will be created in the tank.

In embodiments, the tank can be equipped with a slow rotating agitator ensuring a careful stirring and homogeneous mixing of particulate products simultaneously with the creation of an axial flow, which feeds the bottom impeller. When mounted with scraper blades, the agitator ensures that the product does not burn and stick to the tank wall during indirect heating (tank with cooling/heating jacket). By means of vacuum, powder is transported into the tank through a special powder inlet valve.

The plant-based cheese mixture may be directed into liquid below the liquid surface with air and gas being removed by a vacuum pump. The large free liquid surface provides an effective de-aeration of the product, unlike traditional mixing that generally incorporate air during mixing. This helps to reduce oxidation, improve product quality and consistency. Addition of powders or other dry matter can also take place through the manway placed in the top of the tank.

As illustrated in FIG. 1, it is possible to utilize one or more mixers to combine the plant-based ingredients 105. The number and configuration of such devices may vary based on the ingredients, production volume, factory floor space, capacity, and capability of the mixing devices. In embodiments, a scraped surface heat exchanger may be used, being connected between a processor and in-line mixer, such as if pasteurization is required. In another embodiment, an infusion heating device, in combination with a heat exchanger, for instance a scraped heat exchanger may be used, e.g., connected between a processor and a mixer. Such configurations may be used for sterilization of the plant-based cheese mixture.

After blending 110, the mixed ingredients are transferred to a heat treatment 120 area or machine, capable of heating and cooling the ingredients. In embodiments, a hygienic heat exchanger and/or a scraped surface heat exchanger can be used for heating and cooling. Examples of applicable heat exchangers are SPX FLOW's hygienic heat exchanger, as discussed in U.S. Pat. No. 10,627,169, and scraped surface heat exchanger, as discussed in WO 2007/039,296, both of which are incorporated herein by reference.

The plant-based cheese mixture can be transferred to a buffer tank 130 for a predetermined period of time. In embodiments, the buffer tank is a thermostatic buffer tank. In embodiments, the buffer tank has a conical portion, such as a conical base as illustrated in FIG. 1

One or more additional ingredients can be added to the cheese mixture through injection technological auxiliaries 135, such as injection pumps. Additional ingredients include, but are not limited to one or more bacteria cultures 137a, acids 137b, and salts 137c. Examples include chemical acidulants such as glucono-delta-lactone. Production aids can be added to stimulate texturization of the plant-based cheese mixture.

The additional ingredients can be dynamically mixed together, using a dynamic mixer 140. After the mixture is combined, it is transferred to a hot filling station 145 for packaging. The packaged cheese can undergo acidification 150, e.g., in a hot room, refinement 160, and cold storage 170.

With regard to filling and packaging, embodiments can mold and directly portion cheeses in any desired shape and/or size. This technology enables a wide variety of unusual cheese shapes to be obtained owing to the removal of mechanical pressing. Accordingly, the present disclosure also enables systems and methods of filling and directly portioning a pre-cheese mixture of the present disclosure into a mold of a desired shape using conventional methods of filling or using the cheese making apparatus of the disclosure. In some embodiments, cheeses can be placed in molds, then removed from molds, and placed in consumer packaging. Additional treatments can be performed during or after hot filling, e.g., to salt the plant-based cheese, obtain rinds, special flavors, and so forth. Additional cheese-making techniques may be performed as known to those skilled in the art. The plant-based cheese product can comprise any of a variety of semi-hard cheeses, spreadable cheeses, pizza topping cheese, soft cheese, and other cheese products.

As discussed herein, the disclosed plant-based cheese making systems and methods can be implemented as continuous, closed processes. The plant-based cheese product is continuously produced and transferred along each apparatus of the system, thus reducing and even eliminating the need of workers to transfer the mixture along the production line. The plant-based mixture remains enclosed within the system from start to finish, thus reducing and/or eliminating exposure, to air, humans, the atmosphere, and other contaminants. The continuous process further enables an efficient, streamlined preparation of the product, and allows multiple batches to be processed at the same time.

As such, the present invention significantly reduces cheese preparation and production time, as compared to traditional systems, and reduces contamination risks. Such production can be fully or partially automated and monitored using one or more computing and control systems to manage, maintain, and/or operate various aspects of the plant-based cheese production. Automation can further assist in enabling the continuous, closed production of one or more cheese batches.

Figure 2:
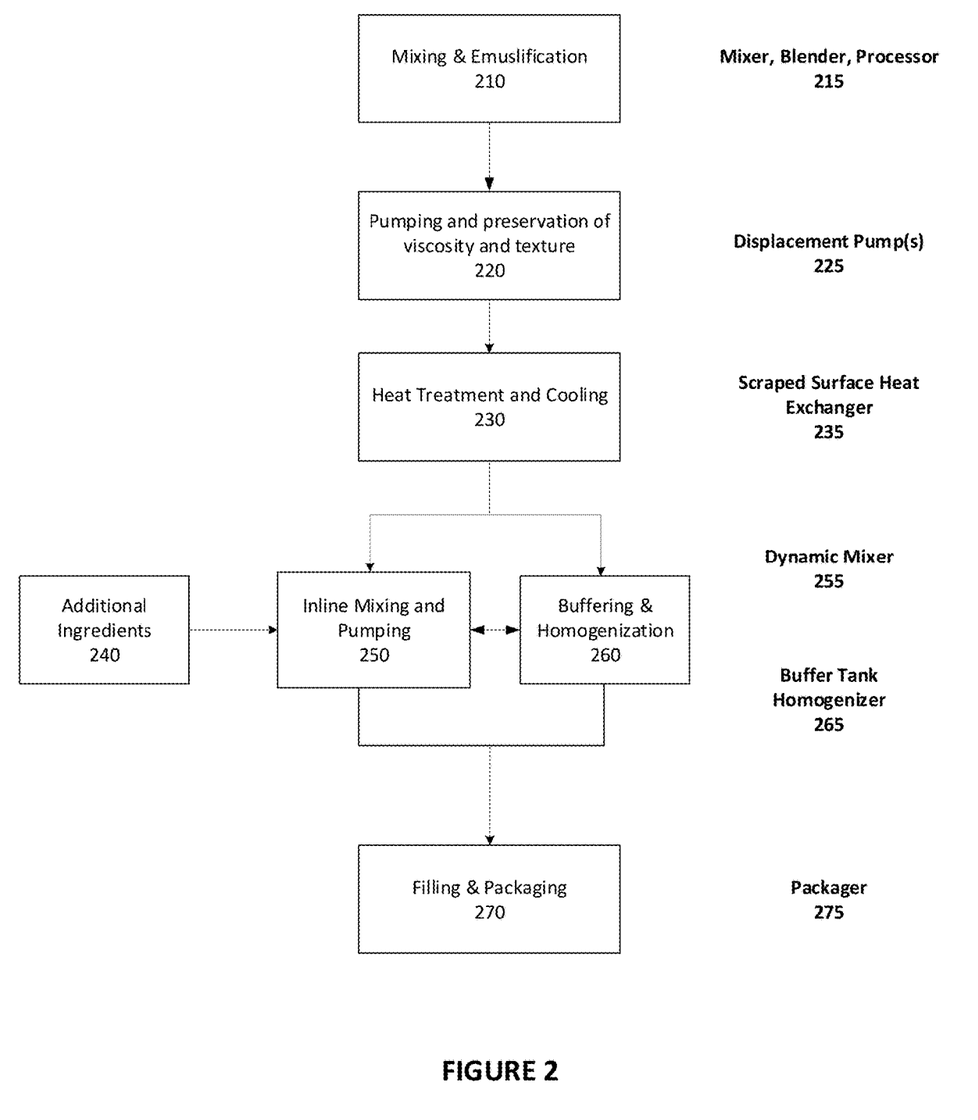
FIG. 2 illustrates a method for making plant-based cheese in accordance with embodiments discussed herein.

FIG. 2 illustrates the plant-based cheese making process, along with one or more devices usable to execute each step of the process, and various distinctions and advantages as compared to traditional dairy-based cheese making processes.

As discussed herein, a plant-based cheese mixture can undergo mixing and emulsification 210 using at least one of a mixer, blender, and processor, such as an SPX FLOW PROCESSOR. The plant-based mixture may be prepared using physical actions (e.g., heat treatment, homogenization mixing, etc.), enzymatic actions and chemical actions.

In examples, mixing and emulsification of the plant-based cheese mixture can occur in the presence of enzymes at temperatures under 50° C., between 44-48° C., and other ranges below 48° C. The mixing and emulsification can be performed using processors and mixers with high capabilities for emulsion, and high shear.

In an example, in accordance with embodiments, mixing and emulsification occurs under low pressure or in a vacuum. During this process, the mixture can undergo emulsion, hydration, and enzyme action for various lengths of time. For example, mixing can occur in a vacuum, with ten minutes for emulsion, thirty minutes for hydration, and sixty minutes for enzyme action to occur. Such mixing can occur with various agitation rates, such as between 700-800 revolutions per minute, 720-780 revolutions per minute, 740-760 revolutions per minute, and around 750 revolutions per minute.

Enzymes can be introduced into the mixing process to assist with mixing, texturization, and/or hydration of the plant-based ingredients, particularly plant-based proteins. Plant-based proteins have been found to benefit from the introduction of enzymes. The length of time for enzyme action can vary depending on the ingredients of the plant-based mixture and other ingredients.

Compared to traditional, dairy-based cheese making, mixing and emulsification of plant-based ingredients have been successful at significantly lower mixing speeds and lower temperatures than traditional cheeses. For example, in dairy-based cheese processes such as SPXFLOW's patented process WO 2015/185539 A1, the ingredients are often mixed at a rate of >1500 rpm, at temperatures 48-55° C. and higher. In addition, enzymes have not been utilized in traditional dairy cheese-making to assist in hydration of the mixture.

As discussed herein, the various pumping systems, e.g., SPX FLOW's Universal 3-series pumps can be implemented to assist in the transfer of the product between apparatuses, such as the vacuum mixer 115 to heat exchangers 125, buffer tanks 130, dynamic mixers 140, and packaging. Such pumping systems can comprise positive displacement pumps, which have been found to preserve the viscosity and texture of plant-based cheese mixtures through gentle pumping actions.

In various embodiments, implemented pumps may be configured to handle up to 34.5 bar of pressure and 149° C. The configuration and properties of pumps may vary to handle higher temperatures, such as higher sterilization temperatures, and withstand various pressures and ranges of pressures.

In accordance with the present disclosure, the pumps may be configured to have no bearings in the product zone. In other words, the pumps do not have bearings in areas where the product flows. Shaft strength can be configured to eliminate vibration, and in embodiments, may comprise steel, specifically stainless steel. Body retaining screws may be implemented to maintain a mechanical seal e.g., during inspection. In various embodiments, the pumps can be positive displacement pumps, centrifugal pumps, or any of a variety of types and combinations of pumps to achieve the functions discussed herein.

Heat treatment and cooling can occur using a heat exchanger. In accordance with embodiments, the heat exchanger rotates and spins the plant-based mixture, while maintaining a particular temperature for a holding time. A scraped surface heat exchanger comprises one or more blades that rotate within the heat exchanger to scrape, wipe, and/or come substantially near the internal surface and remove layers built up on such surface.

Treatment in a heat exchanger, particularly a scraped surface heat exchanger, assists with heat transfer with viscous plant-based mixture during the heating and cooling phase. Various heat exchangers and scraped surface heat exchangers may be implemented in accordance with embodiments of the present invention. For example, rotating tubular scraped surface heat exchangers, reciprocating tubular scraped surface heat exchangers, fall within the scope of the systems and methods discussed herein.

Heat treatment and cooling 230 for plant-based cheese mixtures can be performed at notably lower temperatures and holding times, as compared to traditional cheese-based processes. In embodiments, heat treatment occurs by heating the plant-based cheese mixture to a set final heating temperature for a set holding time. After heat treatment, the product is cooled to a second temperature for a second holding time and spun at a second rate (rpm), which may be the same or lower than the first rate. The rotation of the product within the heat exchanger may be varied depending on the viscosity of the product and desired texture. For example, a lower rotation rate may be desired to preserve texture of the product.

In accordance with the present disclosure, heat treating occurs around 85-95° C. Heat treating can occur for a holding time, which may be 10-20 seconds. Heat treating can occur at a scraper rate of 700-800 rpm for SSHE, and at a rate of approximately 750 rpm. Cooling occurs around 38-45° C. in case of starter, while in case of organic acid cooling occurs at 65-75° C. In additional embodiments, the heat treatment and cooling can be tailored to inactivate specific enzymes or reach a desired temperature. For example, heat treating the mixture at a first temperature of 85-95° C. may be implemented to inactivate enzyme in the plant-based mixture, in accordance with embodiments discussed herein. In other embodiments, heat treatment may reach a temperature of 85-95° C. to ensure stability for a particular shelf life term.

Following heat treatment and cooling, additional ingredients 240 are added to the mixture. The addition can be done through various devices and apparatuses to effect inline mixing and pumping 250. One or more displacement pumps 225, for example, can add the ingredients the heat treated and cooled mixture. Then a dynamic mixer 255 ensures the ingredients are thoroughly combined with the mixture.

In embodiments, the additional ingredients 240 comprise one or more of acids, bacteria cultures, including plant-based bacteria cultures, and salts. To maintain the plant-based nature of the product, no animal-based products, such as dairy or rennet, are added to the mixture. In embodiments, Glucono-delta-lactone (GDL) and/or other acid are added, along with plant-based bacterial cultures and salts. In one example, 0.2% of a starter mixture or acid is added first, followed by a salt. Salt can also be added in the first step, i.e., in the processor at the start of the process.

In accordance with embodiments of the disclosure, the additional ingredients can be added using a dynamic mixer, such as the SPX FLOW Dynamic Mixer. Mixers may be designed to efficiently apply a high shear and ensure a homogenous end product.

The plant-based mixture, including the additional ingredients are viscous, thus the mixing device, e.g., dynamic mixer, should withstand high viscosities, and ideally implemented immediately after the addition of new ingredients to the plant-based mixture. In examples, the mixer can withstand viscosities up to 15.000 cp. Mixing temperatures can occur at a mixing temperature of 60° C. in case of organic acid acidification or lower, depending on the type of product and plant-based cheese. The mixing temperature can be ~38-45° C. for product with bacterial culture.

The plant-based mixture undergoes buffering and optional homogenization 260 to ensure efficient mixing and blending. This process can occur throughout the mixing process. In embodiments, a pump, such as a positive displacement pump as discussed herein, can transfer the combined mixture to a buffer tank. However, it is within the scope of the present disclosure to utilize separate buffer tanks and optional homogenization step to achieve the effects discussed herein.

In examples, a buffer tank 265 can be a thermostatic buffer tank with a conical bottom. A thermostatic buffer tank can be maintained at a first maintenance temperature, e.g., 60-70° C. for product with organic acid and 38-45° C. for product with bacteria culture. Any of a plurality of homogenizers can be applied and implemented to ensure a desired mean particle size and uniform distribution and desired texture of the plant-based cheese mixture.

Homogenization can further occur in one or more stages, with each stage having a different pressure. For example, a first homogenization stage can occur with pressure around 200 bar and a second stage at a lower pressure, e.g., 50 bar. Homogenization can also occur at a single stage. For example, a plant-based cheese product based on soy may be homogenized in a single stage at 50 bar, within a range of 50-60 bar, or a range of 50-200 bar. Temperature may be maintained 70-80° C. Examples of applicable homogenizers include but are not limited to SPX FLOW APV Homogenizers and SPXFLOW designed Buffer Tanks.

Hot filling and packaging 270 of the plant-based cheese product can occur after possible homogenization, e.g., in spreadable cheeses. In other cheeses, hot filling can be done directly from the buffer tanks without homogenization step. In embodiments, the plant-based cheese product is filled at a filling temperature using a packager 275. The packager 275 transfers the plant-based cheese mixture to a mold, retail packaging, or the like for storage, consumption, etc. The filling temperature during packaging may be modified based on the type of cheese product, additional additives being applied to the product, a storage location of the product, and the like. For example, a filling temperature can be 38-45° C. for packaging operations when bacterial acidification or at higher temperature in case of GDL will occur in the mold or retail packaging.

In embodiments, the packaged product acidifies for several hours, e.g., overnight in case of bacteria culture addition, then be transferred to cold storage. Acidification can occur for a period of time necessary for the plant-based cheese product to reach a desired pH. Further treatment can be applied to ensure the product reaches a desired texture.

In embodiments, a pigging system can be added in accordance with the present disclosure. A pigging system minimizes the product losses and CIP time duration. As the Plant based cheeses is very viscous product, process line needs to be designed such that distance from processing line to filling line is kept minimum as possible. In various embodiments, scrapper passes through the pipes of the system, e.g., with compressed air, water, or other cleaning agents. Such pigging systems can reduce or eliminate build up within the system, and assist with cleaning, sanitation, and maintenance. One or more pigging systems and components can be added at one or more points along the cheese-making system. In embodiments, the pigging system can be an aseptic pigging system.

A total production time, from initial mixing and emulsification of ingredients to packaging can be under two hours, or under 1.5 hours. The closed, continuous nature of the plant-based systems and methods discussed herein allow for multiple batches of product to be produced simultaneously. For example, a new batch of plant-based raw materials and plant based ingredients as well as plant-based fats as well as enzyme/s may be mixed and emulsified while a second batch is undergoing heat treatment and cooling, a third batch is undergoing homogenization, and a fourth batch is packaged. In embodiments, the process is performed continuously, with no exposure or contact of the plant-based mixture with humans and/or the atmosphere.

Numbered Embodiments of the Invention

Exemplary numbered embodiments of the invention are shown below:

1. A method of making plant-based cheese, comprising:
preparing a plant-based cheese mixture comprising plant-based ingredients and at least one enzyme;
pumping the plant-based cheese mixture into a heat exchanger, and optionally including homogenization;
heat treating the plant-based cheese mixture for a holding time;
cooling the plant-based cheese mixture;
dynamically mixing additional ingredients;
possible homogenizing (for plant based spreadable cheese) the plant-based cheese mixture; and
packaging the homogenized plant-based cheese mixture, wherein the method is carried out under closed conditions until the packaging of the homogenized plant-based cheese mixture.

2. The method of embodiment 1, wherein the plant-based cheese mixture is dairy-free.

3. The method of embodiment 1 or 2, wherein preparing comprises mixing and emulsifying the plant-based ingredients and the enzyme in a vacuum.

4. The method of any one of embodiments 1-3, wherein mixing occurs at an agitation rate between 700-800 rpm.

5. The method of any one of embodiments 1-4, wherein mixing and emulsifying occurs at a temperature of <50° C.

6. The method of any one of embodiments 1-5, wherein mixing comprises emulsifying for 10 minutes, hydrating the mixture for 30 minutes, and allowing enzyme action to occur for 60 minutes.

7. The method of any one of embodiments 1-6, wherein heat treating occurs at 85-95° C.

8. The method of any one of embodiments 1-7, wherein cooling occurs at 65-70° C.

9. The method of any one of embodiments 1-8, wherein heat treating occurs at 85-95° C. for a holding time of 20 seconds, and cooling occurs at 70-80° C.

10. The method of any one of embodiments 1-10, wherein the enzyme can be transglutaminase and the enzymatic action can be foreseen.

11. The method of any one of embodiments 1-10, wherein the holding time is a length of time needed to deactivate the at least one enzyme.

12. The method of any one of embodiments 1-11, wherein the holding time for heat treating is 10-20 seconds.

13. The method of any one of embodiments 1-12, wherein heat treating occurs at approximately 750 rpm.

14. The method of any one of embodiments 1-13, wherein the additional ingredients comprise at least one of: an acid, a plant-based bacterial culture, and a salt.

15. The method of any one of embodiments 1-14, wherein dynamically mixing comprises first adding the starter or the acid, then adding the salt.

16. The method of any one of embodiments 1-14, wherein the additional ingredients are added and mixed without exposure to atmosphere or humans.

17. The method of any one of embodiments 1-16, wherein filling occurs at <50° C.

18. The method of embodiment 17, wherein filling occurs as 38-45° C.

19. The method of any one of embodiments 1-18, wherein a total production time is less than two hours.

20. The method of any one of embodiments 1-19, further comprising transferring the plant-based cheese mixture to a thermostatic buffer tank maintained at 60-70° C. or at 38-45° C.

21. The method of any one of embodiments 1-20, wherein homogenization occurs in a single stage at a pressure of 50-60 bar.

22. The method of any one of embodiments 1-21, wherein homogenization occurs at a working pressure of 50-200 bar, at a temperature of 70-80° C.

23. A system for making plant-based cheese, comprising:
a vacuum mixer to combine a plant-based cheese mixture comprising plant-based ingredients and at least one enzyme;
at least one displacement pump for transferring the plant-based cheese mixture;
a heat exchanger to heat treat the plant-based cheese mixture for a holding time, then cool the plant-based cheese mixture;
a thermostatic buffer tank;
a dynamic mixer for adding additional ingredients; and
a homogenizer to homogenize the plant-based mixture with the additional ingredients, wherein the system is configured to be operated under closed conditions.

24. The system of embodiment 23, wherein the mixer is a vacuum mixer.

25. The system of embodiments 23 or 24, wherein the mixer comprises an inclined tank.

26. The system of any one of embodiments 23-25, wherein the inclined tank comprises a bottom-mounted high shear mixer. The system of embodiment 23, wherein the mixer comprises at least one positive booster pump for internal recirculation to decrease a particle size of the plant-based cheese mixture.

27. The system of any one of embodiments 23-27, wherein the at least one displacement pump comprises stainless steel.

28. The system of any one of embodiments 23-28, wherein the heat exchanger is a scraped-surface heat exchanger.

29. The system of any one of embodiments 23-29, wherein the thermostatic buffer tank comprises a conical bottom.

30. The system of any one of embodiments 23-30, wherein the thermostatic buffer tank is maintained 60-70° C. or at 38-45° C.

31. The system of any one of embodiments 23-31, wherein the additional ingredients comprise at least one of: an acid, a plant-based bacterial culture, and a salt.

32. The system of any one of embodiments 23-32, further comprising a packager configured to package the homogenized, plant-based cheese mixture.

It is clear that the description of the specific embodiments of the invention is not to be intended to limit the scope of protection which is defined by the claims. It is also clear that obvious alternatives which the skilled person will notice by reading the specification are intended to be in the scope of protection as defined by the claims.

The term "comprising" as used in the claims does not exclude other elements or steps. The term "a" or "an" as used in the claims does not exclude a plurality.

Although embodiments in accordance with the present invention has been described in detail for purpose of illustration, it is understood that such detail is solely for that purpose, and variations can be made therein by those skilled in the art without departing from the scope of the invention.

What is claimed is:

1. A method of making plant-based cheese, comprising:
preparing a plant-based cheese mixture comprising plant-based ingredients and at least one enzyme by mixing at an agitation rate between 700-800 rpm and emulsifying the plant-based ingredients and the enzyme at a temperature of <50° C. in a vacuum mixer;
pumping the plant-based cheese mixture into a heat exchanger for heating and cooling the plant-based cheese mixture;
heat exchanger heat treating the plant-based cheese mixture at a temperature sufficient to inactivate the at least one enzyme for a holding time;
homogenizing the plant-based cheese mixture after the heat exchanger heat treating and prior to cooling;
cooling the homogenized plant-based cheese mixture;
dynamically mixing additional ingredients using a mixer that can withstand viscosities up to 15000 cp into the cooled homogenized plant-based cheese mixture; and
packaging the homogenized plant-based cheese mixture, wherein the method is carried out under closed conditions until the packaging of the homogenized plant-based cheese mixture.

2. The method of claim 1, wherein the plant-based cheese mixture is dairy-free.

3. The method of claim 1, wherein the method does not require draining of waste.

4. The method of claim 1, wherein mixing comprises emulsifying for 10 minutes, hydrating the mixture for 30 minutes, and allowing enzyme action to occur for 60 minutes.

5. The method of claim 1, wherein heat treating occurs at 85-95° C.

6. The method of claim 1, wherein cooling occurs at 65-70° C.

7. The method of claim 1, wherein heat treating occurs at 85-95° C. for a holding time of 20 seconds, and cooling occurs at 70-80° C.

8. The method of claim 1, wherein the holding time for heat treating is 10-20 seconds.

9. The method of claim 1, wherein heat treating comprises stirring at approximately 750 rpm.

10. The method of claim 1, wherein the additional ingredients comprise at least one of: an acid, a plant-based bacterial culture, and a salt.

11. The method of claim 10, wherein dynamically mixing comprises first adding the starter or the acid, then adding the salt.

12. The method of claim 1, wherein the additional ingredients are added and mixed without exposure to atmosphere or humans.

13. The method of claim 1, wherein the packaging comprises filling in molds and wherein the filling occurs at <50° C.

14. The method of claim 13, wherein filling occurs at 38-45° C.

15. The method of claim 1, wherein a total production time is less than two hours.

16. The method of claim 1, further comprising transferring the plant-based cheese mixture to a thermostatic buffer tank maintained at 60-70° C.

17. The method of claim 1, wherein homogenization occurs in a single stage at a pressure of 50-60 bar.

18. The method of claim 1, wherein homogenization occurs at a working pressure of 50-200 bar, at a temperature of 70-80° C.

19. The method of claim 1, wherein the heat exchanger is a hygienic heat exchanger and/or a scraped surface heat exchanger.

* * * * *